United States Patent Office 3,825,586
Patented July 23, 1974

3,825,586
PROCESS FOR ENRICHING TRANS-TRANS SALTS OF BIS(4-AMINOCYCLOHEXYL)METHANE AND 1,12-DODECANEDIOIC ACID
Klaus Friedrich Traumann, Wilmington, Del., assignor to E. I. du Pont de Nemours and Company, Wilmington, Del.
No Drawing. Filed Nov. 21, 1969, Ser. No. 878,930
Int. Cl. C07c 87/14
U.S. Cl. 260—501.2               3 Claims

ABSTRACT OF THE DISCLOSURE

A salt of bis(4 - aminocyclohexyl)methane and 1,12-dodecanedioic acid can be enriched in trans-trans isomer content by preparing the salt in and precipitating from methanol.

BACKGROUND OF THE INVENTION

This invention concerns an improved process for preparing a PACM–12 salt which is rich in trans-trans isomer content. The PACM–12 salt is useful in a polymerization process for preparing a PACM–12 polyamide of the type described in Speck U.S. 3,393,210. This polymer with a high trans-trans stereoisomer content is superior to polymer with low trans-trans content with respect to certain properties.

It is known in the prior art to prepare a polyamide from a salt of a diamine and a dicarboxylic acid. These salts are referred to as "amine salts" or "substituted ammonium salts." The particular salt of interest in the present invention is obtained from a diamine designated by the abbreviation PACM which stands for bis(4 - aminocyclohexyl)methane and the 12-acid, which is 1,12-dodecanedioic acid.

PACM is ordinarily obtained by hydrogenation of the aromatic precursor, e.g., see U.S. Pat. 2,494,563, and this will generally yield a mixture of about 52% trans-trans, 9% cis-cis, and 39% cis-trans isomers. In some cases a percentage or two of an o,p'-isomer, i.e., 2,4'-diamino (dicyclohexyl)methane, may also be present. Solvent media have been sought which might be satisfactory as a means for separating the trans-trans isomer from the cis-cis, cis-trans and other materials which are present in the salt strike vessel. For this purpose water may be used as the solvent provided the mixture is heated to a temperature from about 110° C. to about 160° C. under pressure in an autoclave. The use of water for this purpose has been disclosed in Belgian 695,766, granted May 31, 1967. A disadvantage of the water system is that it requires the use of expensive pressure equipment.

SUMMARY OF THE INVENTION

The purpose of the present invention is to provide a simple process for obtaining enriched trans-trans PACM/12-acid salt at atmospheric pressure from mixtures of trans-trans PACM salt and other salt isomers such as cis-cis, cis-trans and ortho-para. The process comprises forming and/or agitating a PACM/12-acid salt mixture in methanol and then filtering to separate a methanol-soluble fraction from a methanol-insoluble fraction, the methanol-insoluble fraction being richer in trans-trans PACM/dicarboxylic acid salt.

DETAILS OF THE PROCESS

The beneficial effects of methanol in the process may be realized either by precipitating the PACM/dicarboxylic acid salt in the presence of methanol or by extraction of an already-precipitated PACM/dicarboxylic acid salt. The precipitation method comprises pouring a solution of the dicarboxylic acid salt in methanol into a solution of the PACM diamine in methanol (or vice versa). The reactants should be employed in approximately chemically equivalent quantities. The total methanol concentration should be sufficient to partially dissolve the PACM/dicarboxylic acid salt which is formed. An excess should be avoided since use of an excess will tend to give lower yields of the trans-trans fraction in the precipitate.

The extraction method for an already-precipitated salt comprises simply stirring the solid precipitate with methanol. By this process the more soluble salts may be removed from the trans-trans fractions by dissolving. The trans-trans fraction remains behind as insoluble material.

Since methanol is more effective than other solvents in separating the isomers of PACM salts, it should not be excessively diluted during the operation. Preferably, at least 80% of the solvent should be methanol.

The methanol extraction or precipitation processes may utilize temperatures up to the boiling point of methanol to promote dissolution of the more soluble components. Prior to filtration, cooling may be employed for increasing the yield of insoluble material.

The percent of each isomer may be determined by vapor phase chromatography, nuclear magnetic resonance, or other methods.

EXAMPLE I

A solution containing 30 lbs. of 1,12-dodecanedioic acid and 30 gallons of methanol was prepared by stirring in a 65-gallon tank. Into this solution was poured with stirring 36 lbs. of another methanol solution containing 76.5% by weight (27.5 lbs.) of a mixture of stereoisomers of bis(4-aminocyclohexyl)methane (PACM). This mixture prior to use in the experiment contained 70% by weight trans-trans isomer as determined by the vapor phase chromatography method.

A precipitate formed when the methanol solution of 1.12-dodecanedioic acid was poured into the methanol solution containing the mixture of PACM isomers. The slurry containing the methanol, the diacid, and the diamine was stirred vigorously for 60 minutes to avoid formation of large lumps. The slurry was then allowed to stand for 35 hours. It was then filtered. The filter cake was sucked dry, washed with 2 to 3 gallons of methanol and dried in a vacuum oven at 60° C. The resulting cake was ground up to a particle size less than ⅛-inch. The weight was 38.0 lbs. This precipitate was analyzed by vapor phase chromatography to determined the percent by weight trans-trans, cis-trans, and cis-cis diamine in the diamine equivalent of the salt. The analysis showed 98.0% trans-trans and 2.0% cis-trans in the precipitate.

The filtrate from the above-mentioned filtration was combined with the wash liquor and the entire solution was subjected to evaporation in a vacuum oven at 60° C. A solid was obtained which was ground to ⅛-inch particle size. The weight was 18 lbs. The total solid recovered (soluble plus insoluble) was 97.5%.

EXAMPLE II

The experiment of Example I was repeated, but this time the slurry was allowed to stand only 10 hours instead of 35 hours. The precipitate after washing weighed 37.5 lbs. Analysis of the insoluble solid by vapor phase chromatography indicated 97.2% trans-trans and 2.8% cis-trans. The cake recovered from the filtrate weighed 18.5 lbs. The total solid recovered (soluble and insoluble) was 97.5%.

The insoluble solids (salts) from Examples I and II are blended with other PACM salt isomers to prepare PACM polymers by melt polymerization. The soluble solids (salts) recovered from the filtrate may also be used for polymer production.

What is claimed is:

1. A process for obtaining enriched trans,trans salt of bis(4-aminocyclohexyl)methane and 1,12-dodecanedioic acid at atmospheric pressure from a mixture containing 70% by weight of trans,trans salt of bis(4-aminocyclohexyl)methane and 1,12-dodecanedioic acid and balance of other stereoisomers of such salt which comprises forming the salt mixture by reacting approximately equivalent quantities of the diamine and diacid in methanol and separating the precipitated trans,trans rich salt from the liquid medium.

2. A process for obtaining enriched trans,trans salt of bis(4-aminocyclohexyl)methane and 1,12-dodecanedioic acid at atmospheric pressure from a mixture containing 70% by weight of trans,trans salt of bis(4-aminocyclohexyl)methane and 1,12-dodecanedioic acid and balance of other stereoisomers of such salt which comprises forming and agitating the salt mixture by reacting approximately equivalent quantities of the diamine and diacid in methanol and separating the precipitated trans,trans rich salt from the liquid medium.

3. A process for obtaining enriched trans,trans salt of bis(4 - aminocyclohexyl)methane and 1,12-dodecanedioic acid at atmospheric pressure from a mixture containing 70% by weight of trans,trans salt of bis(4-aminocyclohexyl)methane and 1,12-dodecanedioic acid and balance of other stereoisomers of such salt which comprises agitating the salt mixture in methanol and separating the precipitated trans,trans rich salt from the liquid medium.

References Cited

UNITED STATES PATENTS

| | | | |
|---|---|---|---|
| 3,661,982 | 5/1968 | Beswick | 260—501.2 |
| 3,476,713 | 11/1969 | Dorsey | 260—501.2 |
| 3,502,624 | 3/1970 | Flack et al. | 260—501.2 |

FOREIGN PATENTS

| | | |
|---|---|---|
| 6,807,344 | 11/1968 | Netherlands. |

JOSEPH E. EVANS, Primary Examiner

M. W. GLYNN, Assistant Examiner

U.S. Cl. X.R.

260—78 R